(12) United States Patent
Blase

(10) Patent No.: US 6,615,573 B2
(45) Date of Patent: Sep. 9, 2003

(54) ENERGY DRAG CHAIN

(75) Inventor: Günter Blase, Bergisch Gladbach (DE)

(73) Assignee: Igus Spritzgussteile fur die Industrie GmbH, Koln (DE)

( * ) Notice: Subject to any disclaimer, the term of this patent is extended or adjusted under 35 U.S.C. 154(b) by 0 days.

(21) Appl. No.: 10/205,744

(22) Filed: Jul. 26, 2002

(65) Prior Publication Data

US 2003/0024231 A1 Feb. 6, 2003

Related U.S. Application Data

(63) Continuation of application No. PCT/DE01/00202, filed on Jan. 18, 2001.

(30) Foreign Application Priority Data

Jan. 27, 2000 (DE) .......................................... 200 01 505

(51) Int. Cl.⁷ ............................ F16G 13/00; F16G 13/16
(52) U.S. Cl. ............................ 59/78.1; 59/900; 248/49
(58) Field of Search .................... 29/78.1, 900; 248/49, 248/51

(56) References Cited

U.S. PATENT DOCUMENTS 5,020,313 A  * 6/1991 Moritz et al. ................ 59/78.1
5,771,676 A    6/1998 Komiya et al.
5,860,274 A  * 1/1999 Saleh et al. ................... 59/78.1
6,173,560 B1 * 1/2001 Weber ......................... 59/78.1
6,354,070 B1 * 3/2002 Blase .......................... 59/78.1
6,425,238 B1 * 7/2002 Blase .......................... 59/78.1

FOREIGN PATENT DOCUMENTS

DE      3928236 C1    10/1990
EP      0 456 537 A1  11/1991

* cited by examiner

Primary Examiner—David Jones
(74) Attorney, Agent, or Firm—Akin Gump Strauss Hauer & Feld, L.L.P.

(57) ABSTRACT

An energy drag chain is provided for guiding tubes, cables or the like between two points or connection that can be moved relative to each other. The drag chain comprises a plurality of chain members hinged to one another, each having two lateral flat links and cross members inter-linking the flat links. Such a drag chain provides a sound-damping which does not entail the deposit of dirt on the support or the guide channel, and which can be reliably installed and supplied in a pre-assembled state with a pre-manufactured system. At least in one chain section the chain members are provided with damping devices that comprise a relatively soft material and project on one side. The damping devices can be particularly configured as mushroom plugs.

14 Claims, 5 Drawing Sheets

ENERGY DRAG CHAIN

CROSS-REFERENCE TO RELATED APPLICATION

This application is a continuation of International Application PCT/DE01/00202, filed Jan. 18, 2001, the disclosure of which is incorporated herein by reference.

BACKGROUND OF THE INVENTION

The invention relates to an energy drag chain for guiding tubes, cables or the like between two points of connection that can be moved relative to each other, the chain having a plurality of chain members hinged to one another, each having two lateral, flat links and cross-members interlinking the flat links.

In horizontal use of such an energy drag chain, one chain end is usually attached to a stationary point of connection, and the other chain end is attached to a horizontally mobile point of connection of the energy consumer. Connected to the stationary point of connection is a straight chain section, which is referred to as the lower strand and is laid on a support surface of the stationary base or on the inside of a guide channel. The lower strand transitions via a deflection zone in the chain into a self-supporting upper strand, or one that slides at least partially on the lower strand or on slide rails of the guide channel. The upper strand is attached to the point of connection of the mobile energy consumer.

If the energy drag chain is operated in push mode by the mobile energy consumer, chain members pivot out of the deflection zone or upper strand and into the extended position of the lower strand, their full surface thereby hitting against the support or the guide channel.

In order to dampen the noise generated in the process, noise-damping, cellular rubber strips were provided on the support surface or in the guide channel. It was found, however, that such damping devices suffer from fatigue over time and are subject to severe wear, particularly with energy drag chains operated at high travel speeds, and that rubber pieces come off which can lead to contamination of the support or the guide channel. Another disadvantage is that the cellular rubber strips have to be mounted during installation of the energy drag chain. Improper mounting can easily impair the noise-reducing function of the rubber strips and the travel behavior of the energy drag chain. The rubber strips cannot be delivered in pre-assembled state with a pre-manufactured system.

An energy drag chain of the type described in the opening paragraph is known from European published patent application EP 0 456 537 A. In the chain members disclosed in this document, skids are provided on the inside of the deflection zone. The skids are used exclusively for sliding the upper strand of the energy drag chain on the lower strand, or on a slide rail provided in a guide channel, and thus to reduce the wear of the associated parts of the chain.

Energy drag chains with skids provided on the inside of the deflection zone are also known from German published patent application DE 196 47 322 A and U.S. Pat. No. 5,020,313. In these chains, the skids serve to avoid wear and noise on chain members that rub together.

BRIEF SUMMARY OF THE INVENTION

An object of the present invention is to provide a device to dampen the noise generated by laying the lower strand of an energy drag chain, which device avoids the disadvantages of the prior art, i.e., which particularly does not lead to the deposit of dirt on the support or the guide channel, and which can be reliably installed and supplied in a pre-assembled state with a pre-manufactured system.

A first solution to this object according to the invention involves an embodiment of the energy drag chain of the type described at the outset, in which the chain members are provided, at least in one chain section, with damping devices made of a soft material, wherein the damping devices are provided on the outer side of the chain in the deflection zone and project from the chain members on this side, and wherein the damping devices are designed as mushroom plugs and display a foot that engages a corresponding groove at the respective point on the chain member.

A second solution to this object according to the invention involves an energy drag chain of the type described at the outset, in which the chain members are provided, at least in one chain section, with damping devices made of a soft material, wherein the damping devices are provided on the outer side of the chain in the deflection zone and project from the chain members on this side, and wherein the damping devices are of strip-like design with a mushroom-shaped cross-section at the top and display a foot that engages a corresponding groove at the respective point on the chain member.

The damping devices can be designed such that they do not suffer from fatigue or wear over a relatively long period of time, meaning that no contamination need be expected. They can be securely mounted on the chain members by the manufacturer and delivered together with the pre-manufactured energy drag chain.

The design according to the invention is advantageous for both short and long travel paths of energy drag chains. It can also be used in vertical applications of energy drag chains. If the chain is suspended in a sheet-metal channel that travels horizontally, the chain hits against the sheet-metal walls of the channel due to the inertial forces acting on it, this leading to considerable impact noise. In order to dampen the noise, damping devices are preferably provided on both of the opposite, narrow lateral surfaces of the lateral flat links, or on the outsides of the cross-members of the chain members.

For better fastening of the damping devices, the groove can have an undercut, into which snaps a corresponding projection on the foot of the damping devices.

In order to mold the undercut on an injection-molded lateral flat link, it can be designed as an opening that runs transverse to the groove and opens on a lateral surface to allow insertion of a mold core.

The damping devices are preferably made of a relatively soft plastic material, such as polyurethane. The damping devices can also be made of a foam or rubber material. The damping material can have greater elasticity or lower hardness compared to the material of which the lateral parts are made.

The damping devices are preferably provided on the lateral flat links of the chain members. In horizontally mobile energy drag chains, in particular, the damping devices can be provided on the narrow lateral surfaces of the lateral flat links running in the longitudinal direction of the chain. The outer surfaces of the cross-members can also be provided with damping devices.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
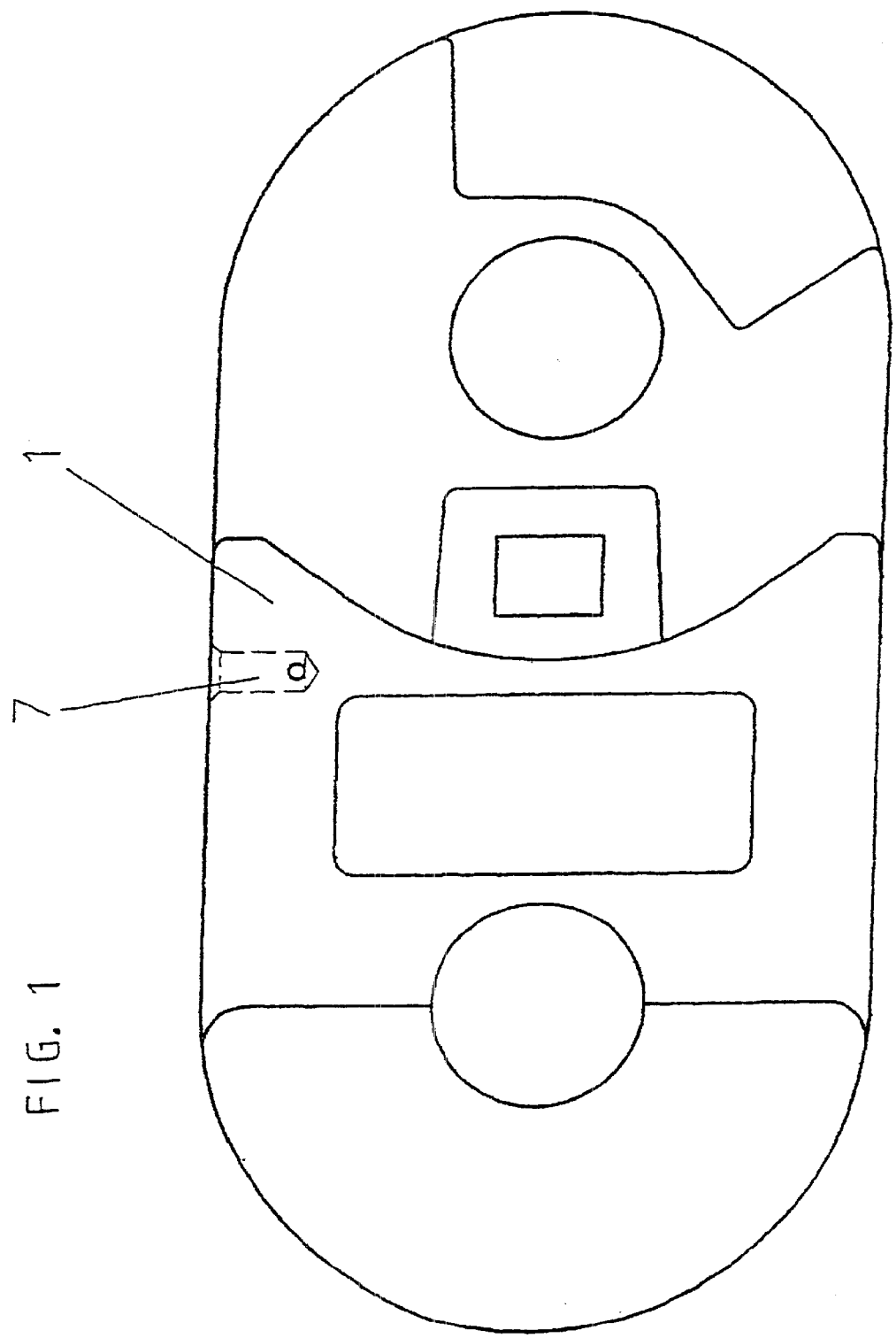
FIG. 1 is a lateral view of a chain member according to the invention.
Figure 2:
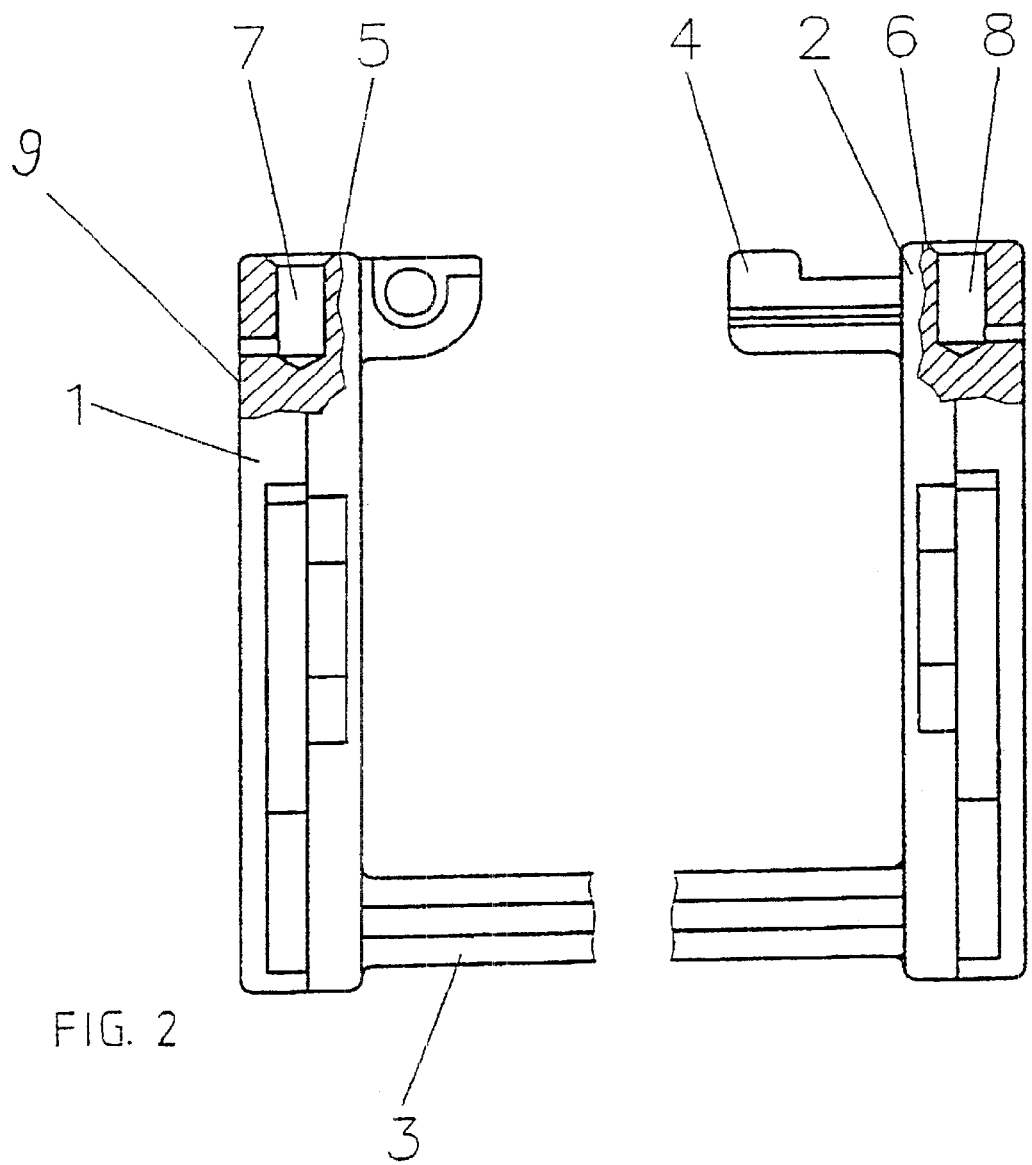
FIG. 2 is a partially sectioned front view of the chain member according to FIG. 1.

As shown in FIGS. 1 and 2, the chain members of the energy drag chain each comprise two lateral flat links 1 and 2, which are connected by cross-members. FIG. 2 shows only lower cross-member 3. The upper cross-member is mounted in pivoting fashion on the left lateral flat link 1 and snapped to the inwardly protruding shoulder 4 of right lateral flat link 2.

In order to dampen the noise, damping devices are provided on upper narrow lateral surfaces 5 and 6 of lateral flat links 1 and 2. The damping devices (described in more detail below) display feet which engage grooves 7 and 8 on upper lateral surfaces 5 and 6.

Figure 3:
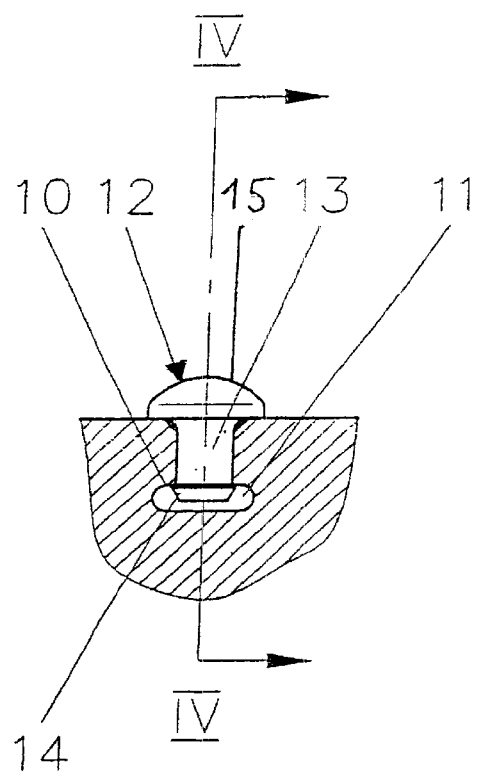
FIG. 3 is a partial longitudinal section through a lateral flat link showing a mushroom plug arranged therein as a damping device.
Figure 4:
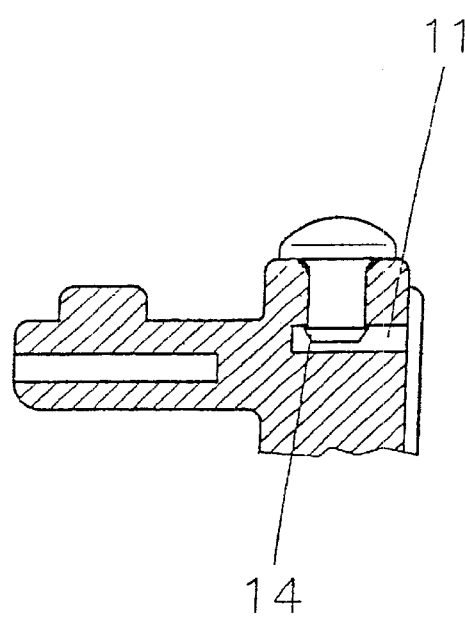
FIG. 4 is a section along line IV—IV in FIG. 3.

FIGS. 3 and 4 show an enlarged view of a special design of grooves 7 and 8 and the damping devices inserted therein.

As shown in FIGS. 3 and 4, grooves 7 and 8 are cylindrical and integrally molded in lateral flat links 1 and 2, perpendicular to upper lateral surfaces 5 and 6. They have undercuts 10 on their lower ends, into which snaps a corresponding projection on the foot of the damping device. Undercut 10 is designed as a cuboid opening 11 that runs transverse to the groove and opens on larger lateral surface 9. Opening 11 is used to integrally mold the undercut of grooves 7 and 8 during injection molding of lateral flat links 1 and 2 with the help of a cuboid mold core.

The damping devices are accordingly designed as mushroom plugs 12 having a cylindrical foot 13, the diameter of which roughly corresponds to the diameter of grooves 7 and 8, an annular projection 14, which projects radially outwardly on the lower end of foot 13 and tapers toward the lower end of mushroom plug 12, roughly to the diameter of foot 13, and a mushroom head 15, which engages the edge of grooves 7 and 8.

The damping devices designed as mushroom plugs 12 can be optionally mounted on lateral flat links 1 and 2 of the chain members of an energy drag chain.

Figure 5:
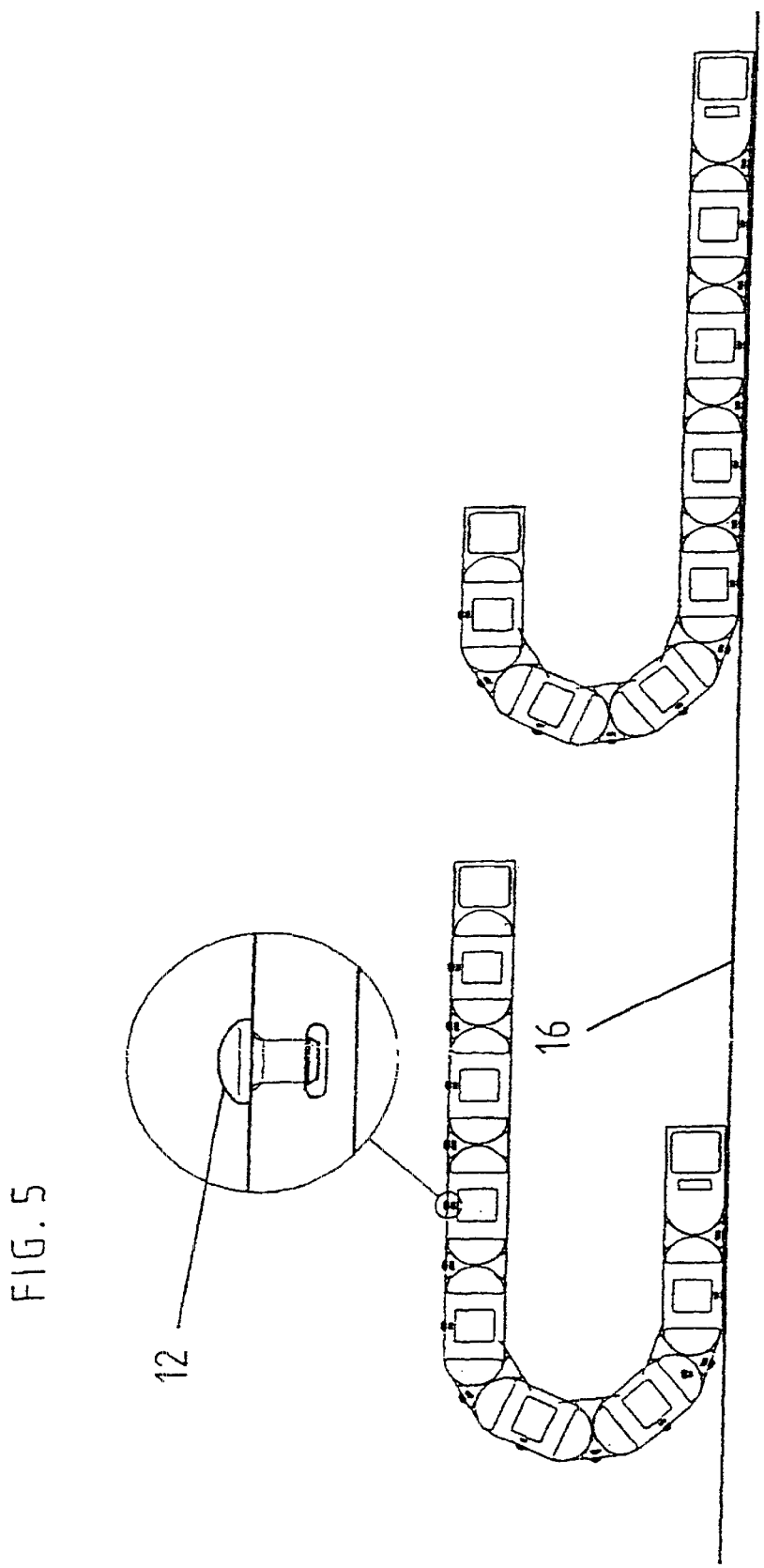
FIG. 5 is a side view of a chain in two consecutive travel positions from left to right in horizontal push mode.

FIG. 5 shows the application of the energy drag chain with damping devices described above, where the chain members are laid in extended position on horizontal support surface 16 during a push operation of the chain. In order to dampen the impact noise generated in this process, mushroom plugs 12 (detailed in the inset) are provided on the outside of the energy drag chain in the region of the narrow lateral surfaces of the lateral flat links.

Figure 6:
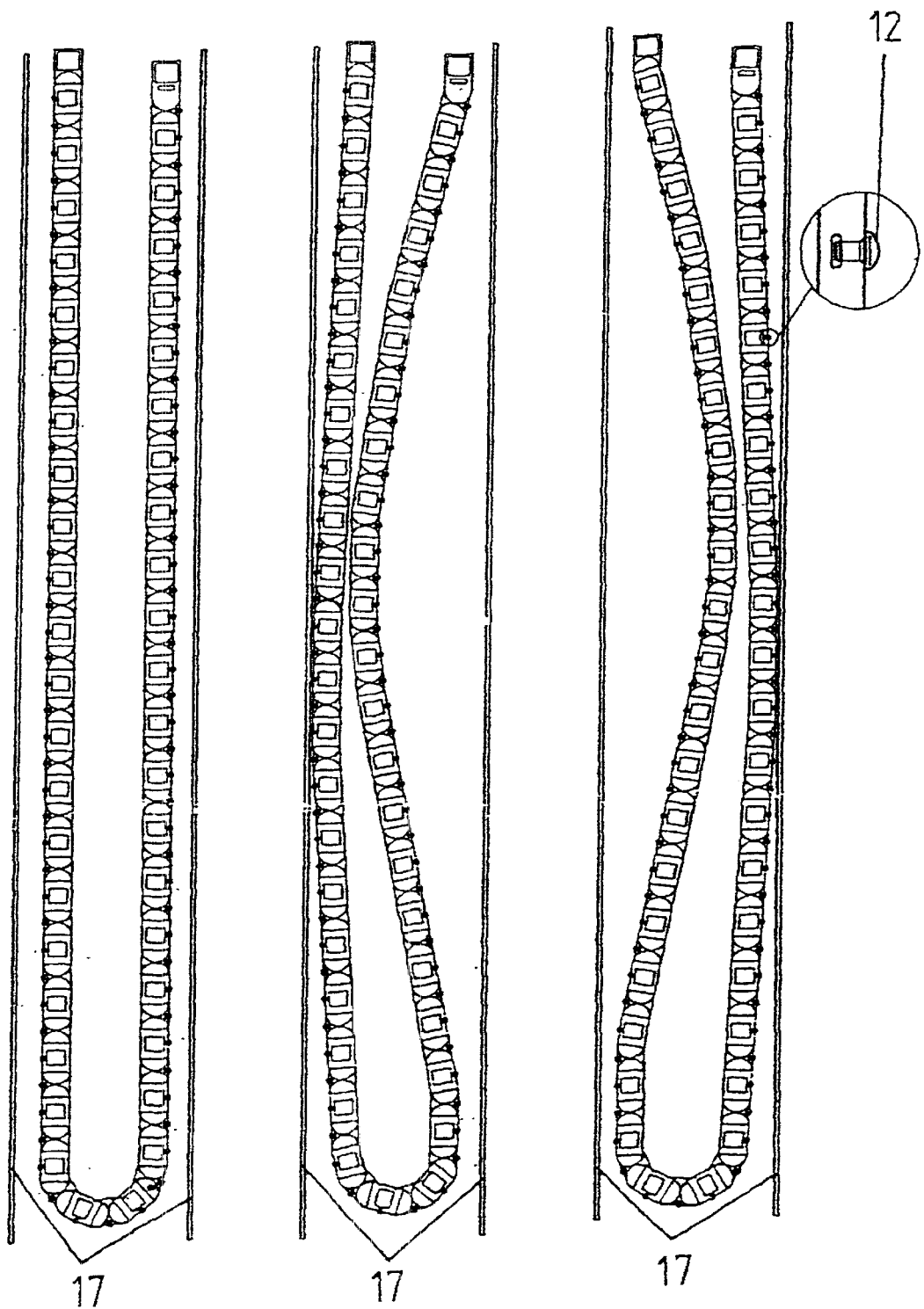
FIG. 6 is a series of side views showing possible positions of a chain in a vertical application in a vertical channel when the channel travels horizontally from left to right.

Another important application is shown in FIG. 6. Here, the energy drag chain is suspended vertically in sheet-metal channel 17, which, in turn, travels horizontally. Due to the inertial forces generated by acceleration during travel, the chain hits the side walls of sheet-metal channel 17, as shown in the middle and right-hand illustrations in FIG. 6. In order to avoid the occasionally considerable impact noise, mushroom plugs 12 (shown in the inset as in FIGS. 3 and 4) are likewise provided on the narrow lateral surfaces of the lateral flat links of the chain members.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. An energy drag chain for guiding tubes; or cables between two connection point movable relative to each other, the drag chain comprising a plurality of chain members hinged to one another, each chain member having two lateral flat links (1, 2) and cross-members (3) inter-linking the flat links the flat links each having a groove (7, 8), the chain having a lower strand attachable to one of the connection points and an upper strand attachable to other of the connection points, the two strands transitioning into one another via a deflection zone, wherein the chain members are provided, at least in one chain section, with damping devices comprising relatively soft material, the damping devices being provided on an outer side of the chain in the deflection zone and projecting from the chain members on the outer side, wherein the damping devices include a top portion (12) that is generally semi-spherical in cross section, each damping device having a foot (13) that engages the corresponding groove on the chain member.

2. The energy drag chain according to claim 1, wherein each groove (7, 8) has an undercut (10) into which snaps a corresponding projection (14) on the foot (13) of each damping device.

3. The energy drag chain according to claim 2, wherein each undercut (10) is designed as an opening (11) that runs transverse to the groove (7, 8) and opens on a lateral surface (9) of a respective flat link (1,2).

4. The energy drag chain according to claim 1, wherein the damping devices comprise a soft plastic.

5. The energy drag chain according to claim 1, wherein the damping devices are provided on the lateral flat links (1, 2).

6. The energy drag chain according to claim 5, wherein the damping devices are provided on narrow lateral surfaces (5, 6) of the lateral flat links (1, 2) running in a longitudinal direction of the chain.

7. The energy drag chain according to claim 1, wherein the damping devices are provided on outer surfaces of the cross-members (3).

8. An energy drag chain for guiding tubes, or cables between two connection points movable relative to each other, the drag chain comprising a plurality of chain members hinged to one another, each chain member having two lateral flat links (1, 2) and cross-members (3) inter-linking the flat links, the flat links each having a groove (7, 8), a lower strand attachable to one of the connection points and an upper strand attachable to the other of the connection points, the two strands transitioning into one another via a deflection zone, wherein the chain members are provided, at least in one chain section, with damping devices comprising relatively soft material, the damping devices being provided on an outer side of the chain in the deflection zone and projecting from the chain members on the outer side, wherein the damping devices are of strip design and have a top portion having a generally semi-spherical cross-section and a foot (13) that engages the corresponding groove on the chain member.

9. The energy drag chain according to claim 8, wherein each groove (7, 8) has an undercut (10) into which snaps a corresponding projection (14) on the foot (13) of each damping device.

10. The energy drag chain according to claim 9, wherein each undercut (10) is designed as an opening (11) that runs transverse to the groove (7, 8) and opens on a lateral surface (9) of a respective flat link (1,2).

11. The energy drag chain according to claim 8, wherein the damping devices comprise a soft plastic.

12. The energy drag chain according to claim 8, wherein the damping devices are provided on the lateral flat links (1, 2).

13. The energy drag chain according to claim 12, wherein the damping devices are provided on narrow lateral surfaces (5, 6) of the lateral flat links (1, 2) running in a longitudinal direction of the chain.

14. The energy drag chain according to claim 8, wherein the damping devices are provided on outer surfaces of the cross-members (3).

* * * * *